United States Patent [19]

Knauer et al.

[11] Patent Number: 4,711,625

[45] Date of Patent: Dec. 8, 1987

[54] NOZZLE CARTRIDGE FOR INJECTION MOLDING

[75] Inventors: Joachim F. Knauer, Deuil la Barrestr. 17, 6000 Frankfurt, Fed. Rep. of Germany, 6000; Martin Freimuth, Downey, Calif.

[73] Assignee: Joachim F. Knauer, Frankfurt, Fed. Rep. of Germany

[21] Appl. No.: 844,933

[22] Filed: Mar. 27, 1986

[30] Foreign Application Priority Data

Jul. 19, 1985 [DE] Fed. Rep. of Germany ....... 3525735
Dec. 19, 1985 [DE] Fed. Rep. of Germany ....... 3545017

[51] Int. Cl.4 ............................................. B29C 45/20
[52] U.S. Cl. ................................... 425/549; 219/421; 264/328.15; 425/144; 425/568; 425/571
[58] Field of Search ............... 425/547, 549, 568, 570, 425/143, 144, 569, 571, 572; 264/328.14, 328.15; 219/421, 523

[56] References Cited

U.S. PATENT DOCUMENTS

| 3,010,155 | 11/1961 | Gilmore | 264/328.15 |
| 4,095,931 | 6/1978 | Reitan | 425/549 |
| 4,161,386 | 7/1979 | Osuna-Diaz | 425/549 |
| 4,230,934 | 10/1980 | ter Beek et al. | 425/549 |
| 4,373,132 | 2/1983 | Vartanian | 264/328.15 |
| 4,443,178 | 4/1984 | Fujita | 425/570 |
| 4,516,927 | 5/1985 | Yoshida | 425/568 |
| 4,576,567 | 3/1986 | Gellert | 425/549 |

Primary Examiner—Jay H. Woo
Assistant Examiner—James C. Housel
Attorney, Agent, or Firm—Holman & Stern

[57] ABSTRACT

A nozzle cartridge installed between a wall and a counter platen has a spreader arranged in a shell which extends as far as the rear end of the spreaded and is formed with a plane end face which contacts a plane area of the counter platen, the shell being clamped between the wall and the counter platen so that movements of the counter platen relative to the wall cannot affect the position of the spreader relative to the shell and thereby the influence on the plastic stream emitted from the nozzle is greatly reduced.

18 Claims, 7 Drawing Figures

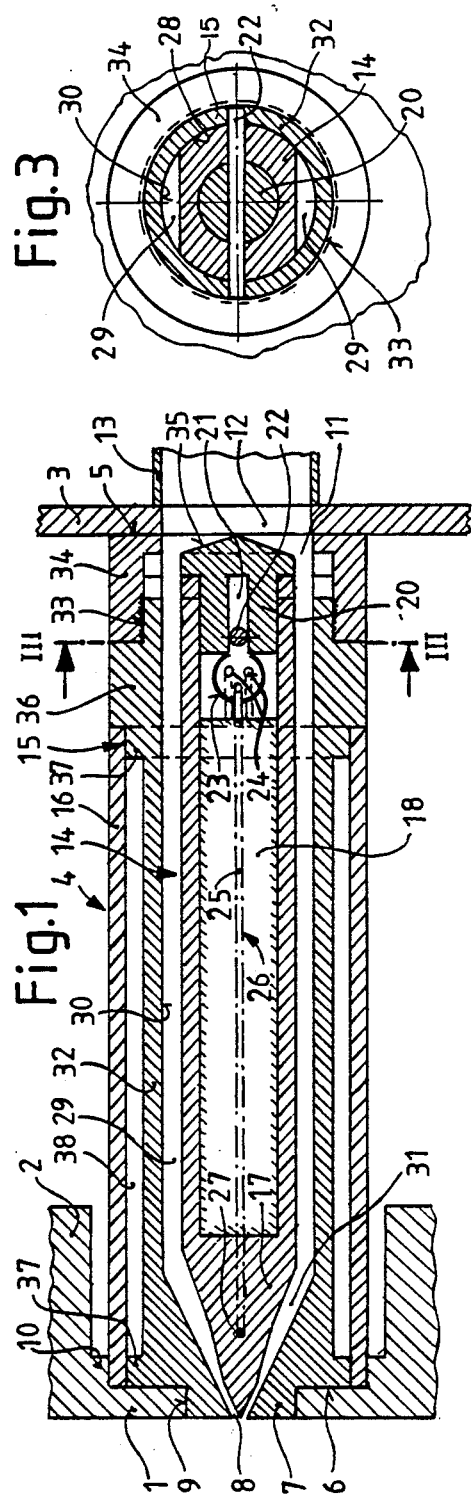
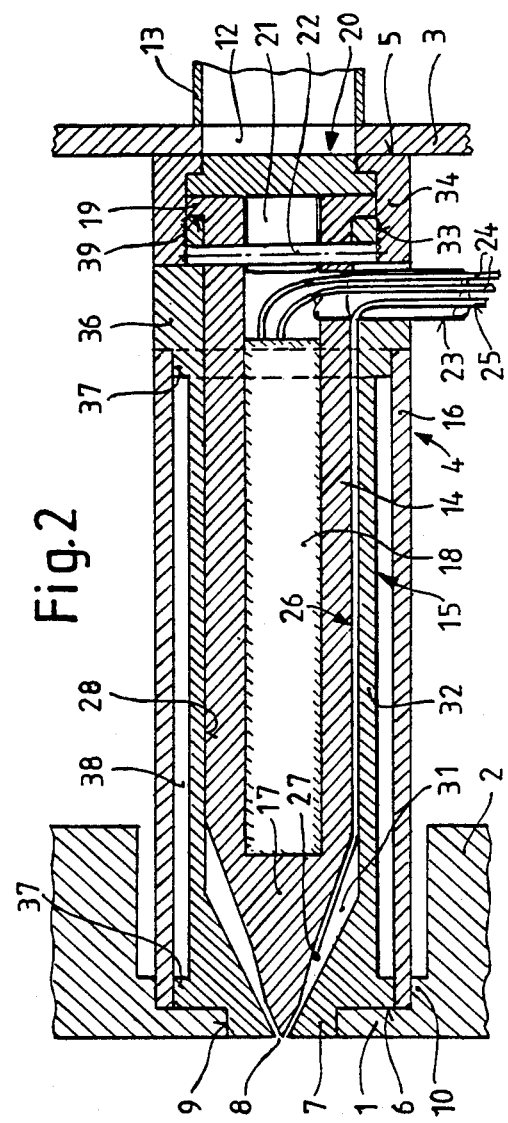

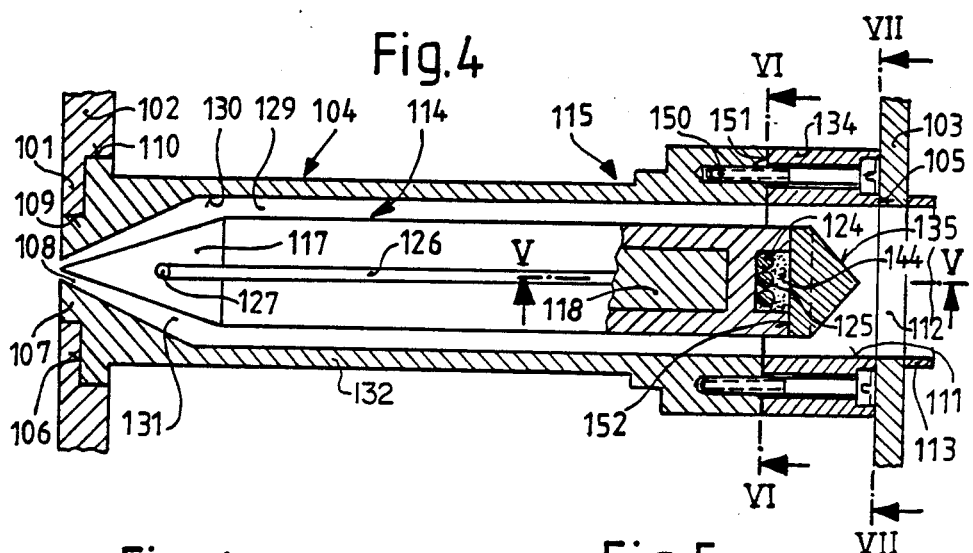
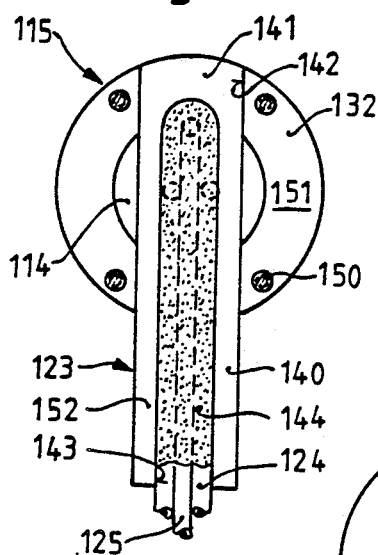
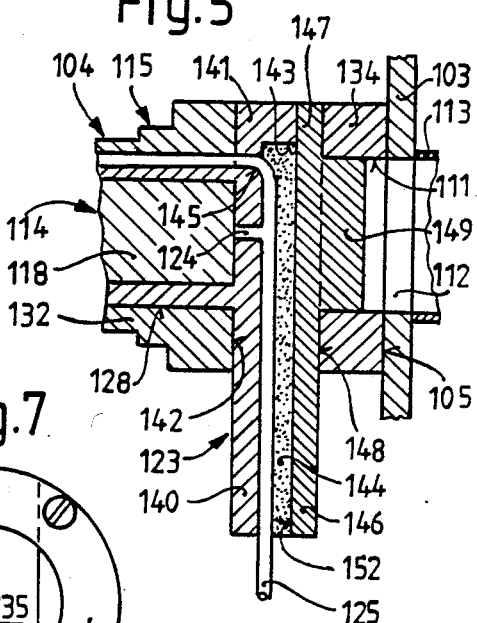
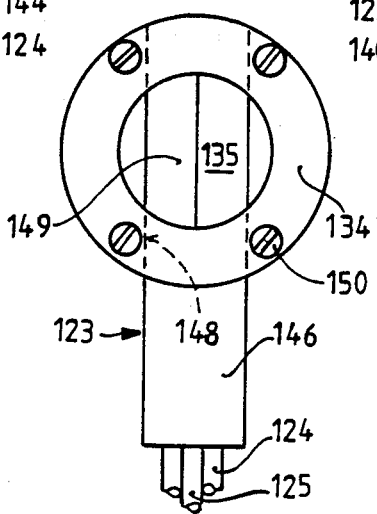

NOZZLE CARTRIDGE FOR INJECTION MOLDING

This application relates to copending application Ser. No. 844,932 filed Mar. 27, 1986.

BACKGROUND OF THE INVENTION

1. Field of the Invention

The invention relates to a nozzle cartridge for injection molding which is installed between a wall adjoining a cavity and a counter platen and which, at the front projects with a registering portion into a recess of the cavity wall, and contacts the latter and, at the rear, contacts the counter platen. A spreader is arranged in a shell and a tip of the spreader ends in a nozzle orifice.

2. Description of the Prior Art

In prior U.S. Pat. No. 3,010,155, there is shown a nozzle cartridge of this type, wherein the spreader projects at the rear end from the shell into which it is screwed. The projecting end region of the spreader is accommodated in a recess of the counter platen. In the injection molding machine, the counter platen tends to move slightly in relation to the cavity wall, both in the direction of the central axis of the nozzle cartridge and at right angles to it. Since the shell is firmly located by the cavity wall and the spreader by the counter platen, even small movements affect the position of the spreader tip in the nozzle orifice which, in turn influences the plastic stream emitted from the nozzle orifice and which is therefore undesirable.

BRIEF SUMMARY OF THE INVENTION

It is an object of the invention therefore to provide a nozzle cartridge of the type initially referred to where the movements of the counter platen relative to the cavity wall have at the most a considerably reduced influence on the plastic stream emitted from the nozzle orifice. The nozzle cartridge according to the invention, which achieves this object, is characterized in that the shell extends as far as the rear end of the spreader and is formed with a plane end face which contacts a plane area of the counter platen.

Since the shell is clamped between the cavity wall and the counter platen the movements are prevented from affecting the position of the spreader relative to the shell. If the counter platen should move at right angles to the central axis, this will not result in any skewing of the nozzle orifice because the counter platen due to the plane contact surfaces can shift relative to the shell which is located at the front end in the cavity wall. The shape of the plastic stream is amenable to a greater extent to pre-planning and, during operation of the injection molding machine, will hardly vary due to movements of the counter platen.

A particularly effective and advantageous feature provides for the shell to be a screwed assembly of a shell member and an end cap with the end cap extending behind and surrounding the rear portion of the spreader. The spreader is fully surrounded by the shell, assembly is straightforward and the shell member can be readily connected with the end cap.

Another particularly effective and advantageous feature provides for the shell to be constructed with a step-shaped projecting spigot with the nozzle orifice and formed with a cylindrical contacting surface on the spigot and behind the spigot. This accurately locates the nozzle orifice in the wall and prevents even small changes in the position of the nozzle orifice.

Yet another particularly effective and advantageous feature provides for the spreader to bear against the shell starting from its tip member and channels for the plastic extending between the spreader and the shell. This improves support of the spreader in the shell and, thereby, the constancy of the nozzle orifice.

Yet another particularly effective and advantageous feature provides for the spreader to be formed at its rear end with a radially extending flange which, in the direction of the central axis, bears against a locating face of the shell. It follows from this that the spreader is inserted in the shell of the nozzle cartridge according to the invention without turning, i.e. a sliding fit in the shell. This arrangement enables the spreader tip to be located in a predetermined and defined position in the nozzle orifice.

Another particularly effective and advantageous feature provides for the spreader to be formed at its rear with a radially projecting entry fitting and for this entry fitting to penetrate through a recess in the shell which is open at the rear end in the direction of the central axis. This is a straightforward method of bringing out the connecting leads from the shell and of installing the spreader in the shell.

In a typical embodiment of the invention, the spreader of the nozzle cartridge is provided with an entry fitting through which the power leads of a heating element and a sheath of a temperature sensor are brought out and which, when the spreader is slid into the shell member, registers in a slot-shaped recess in the shell member. The end cap covers a rear portion of the shell member and is screwed with a female thread onto a male thread of the shell member, whereby the cap extends over the slot-shaped recess up to the entry fitting. The molten plastic processed by the nozzle cartridge, and which is under a high pressure (1000–1500 bar) would be liable to penetrate through the screw threads and leak out at the joint between the cap and the shell member and, in particular, at the entry fitting.

Therefore, it is an object of the invention to provide a tight joint between the shell member and the end cap, in particular, in the area of the entry fitting. Solving this problem, the nozzle cartridge according to the invention is characterized in that the end cap is sealingly seated with lapped faces on lapped faces of the shell member and screws inserted through the end cap are screwed into the shell member, and a longitudinal part of the entry fitting located at the shell member and a longitudinal part of the entry fitting located at the end cap are compressed against each other with lapped faces providing a sealed joint.

The entry fitting which accommodates the power leads of the heating element and the sheath of the temperature sensor is thereby prevented from causing any leakages. As the spreader is inserted, the one longitudinal part of the entry fitting sealingly registers in a recess at the end of the shell member. The other longitudinal part of the entry fitting is a sealing fit on the disc-like end cap. Sealing of the two longitudinal parts of the entry fitting on each other is effected by means of the screws which also maintain a tight contact on the shell member and spreader. In this fashion, the tight seat of the end cap by means of lapped faces is also utilized to prevent leakages on account of the entry fitting.

It is conceivable to provide a groove in both longitudinal parts of the entry fitting for the power leads and the sensor sheath. A specially effective and advantageous feature provides for the longitudinal part of the entry fitting of the end cap to take the form of a non-grooved cover bar. This facilitates manufacture. The longitudinal part of the entry fitting located on the spreader is formed with a groove which is of a sufficiently large cross section to accommodate the power leads and the sensor sheath.

Where the sheath for the temperature sensor extends from the outside of the spreader through a hole into the entry fitting, it is a particularly effective and advantageous feature to have the groove in the spreader-side longitudinal half of the entry fitting accommodating the power leads for the heating element and the sensor sheath filled with insulating ceramic at least in the region of the hole. The molten plastic which is under a high pressure can flow into the hole, but not penetrate into the entry fitting. Application of the insulating ceramic is simplified because it can be smeared into the groove in the longitudinal part of the entry fitting.

Another particularly effective and advantageous feature provides for the outer shape of the cross section of the longitudinal part of the entry fitting to be rectangular and for the longitudinal part of the entry fitting to be sealingly screwed into a corresponding rectangular recess in the shell member and/or the end cap. The longitudinal part of the entry fitting seats with a lapped surface on the lapped surface of the slot wall under the pressure applied by the screws. The seal-fit plane surfaces are easier to manufacture than correspondingly smooth curved surfaces.

Another particularly effective and advantageous feature provides for the groove formed by the entry fitting to be of rectangular cross-section to accommodate the two power leads as well as the sensor sheath side by side in the direction of the central axis. This spacesaving configuration simplifies manufacture of the groove in the longitudinal part of the entry fitting.

Another particularly effective and advantageous feature provides for the sensor sheath to come out of the longitudinal part of the entry fitting connected to the spreader at the side opposite the entry fitting where it is bent to conform to the contour of the shell member. This improves the fit of the sensor sheath in the longitudinal part of the entry fitting and the bend of the sensor sheath is of a more favorable shape.

Yet another particularly effective and advantageous feature provides for the longitudinal part of the entry fitting allied to the end cap to be integral with a divider member which forms two oblique surfaces in the end cap which divide the plastic fed into the nozzle. This feature simplifies manufacture.

Preferred embodiments of the invention will now be described in greater detail with reference to the accompanying drawing wherein FIG. 1 is a longitudinal cross-sectional view through a first embodiment of a nozzle cartridge for injection molding according to the invention;

FIG. 2 is a view similar to FIG. 1, offset 90 degrees relative to FIG. 1;

FIG. 3 is a cross-sectional view taken along line III—III in FIG. 1;

FIG. 4 is a view similar to FIG. 1 of a second embodiment of a nozzle cartridge for injection molding according to the invention;

FIG. 5 is a cross-sectional view taken along line V—V in FIG. 4;

FIG. 6 is a cross-sectional view taken along line VI—VI in FIG. 4; and

FIG. 7 is a cross-sectional view taken along line VII—VII in FIG. 4.

DETAILED DESCRIPTION

A hot-runner injection molding machine according to FIGS. 1-3 comprises a wall 1, which confines a mold cavity which is not shown in detail, and a machine part 2. At a distance from said machine part 2, there is a counter platen 3 as another machine part which is clamped relative to machine part 2 in a manner that is not shown, but which is known per se. Between the machine part 2 and, respectively, wall 1, and the counter platen 3, a nozzle cartridge 4 is interposed which, at its rear end is formed with a plane end face 5 and which bears on a plane area of the counter platen 3 without any interlocking. The nozzle cartridge 4 has at its rear end a single large inlet opening 11 which adjoins a hole 12 in the counter platen 3 to which is joined a feed pipe 13 of matching cross-sectional area for the plastic.

At its front end, the nozzle cartridge 4 forms an annular end face 6 which is at a right angle to the central axis and from which a circular spigot 7 projects steplike at the center in which the nozzle orifice 8 is located at the center. The spigot 7 is a very accurate sliding fit in a hole 9 of the wall 1 and the machine part 2 engages the nozzle cartridge 4 at its front end portion with a circular ledge 10. Apart from this, the nozzle cartridge 4 has no contact with machine parts. The machine parts in contact with the nozzle cartridge and other machine parts adjacent to the nozzle cartridge, but not shown in the drawing, generally are provided with means for cooling.

The nozzle cartridge 4 is provided with a spreader 14 which is a sliding fit in a shell 15 on which is placed a cylindrical jacket 16. Both the front end face and the spigot 7 as well as the rear end face 5 are formed by the shell 15. The spreader 14 is formed with a tip portion 17 which is conically tapered towards the front and whose tip is located in the nozzle orifice 8.

Adjoining the tip portion 17 at the rear is an elongate spreader portion accommodating an elongate heating element 18. The elongate spreader portion continues behind the heating element 18 in the shape of a tube and, at its rear end, is formed with a flange 19 which extends radially outwards. Plugged into the tubular portion from the rear is a mushroom-shaped end member 20 whose head matches the cross section of the spreader. The stem of the end member 20 is provided with a slot 21 which is slid on a pin 22 which traverses the spreader and extends from it with both ends into the shell 15 in order to secure the spreader 14 and its end member against rotation.

This configuration permits the heating element 18 to be slid into the spreader 14 from the rear and to close the latter with the end member 20. A short distance ahead of the end member 20, an entry fitting 23 projects radially from the spreader 14 to form a protection conduit. Entering through the entry fitting 23 are two power leads 24 for the heating element in the spreader and the sheath 25 of a temperature sensor 26 which leaves the entry fitting 23 inside the shell 15, but outside the spreader 14. The temperature sensor sheath 25 extends in contact with the spreader 14 and the shell 15 towards the front as far as the region of the tip portion 17 as close as possible to the tip of the latter. The temperature sensor sheath 25 is placed in a groove of the spreader, hugging the contour of the latter. Extending inside the sheath in a manner not shown in detail, but known per se, there are two insulated wires of different metals which are joined at their front end by a welding bead, i.e. a measuring junction 27, thus forming a thermocouple.

The shell 15 forms an essentially cylindrical cavity which conically tapers in the region of the tip portion 17 towards the nozzle orifice 8. From the tip portion 17 towards the rear, the spreader 14 contacts the shell 15 at two opposite sides along circular arc shaped interface 28, the circular arc on each side extending over more than 90 degrees. Between these circular arcs 28, the spreader is flattened behind the tip portion 17 on two opposite sides so that, between the spreader and the shell 15, there are two channels 29 which form circular arc-shaped interfaces 30 with the shell, the circular arc on each side extending over less than 90 degrees. Each channel 29 extends from the tip portion 17 with a constant cross-section towards the rear up to the head of the end member 20. The two channels 29 continue at the front end into a conical annular channel 31 in the region of the tip portion 17 which opens into the nozzle orifice 8.

The shell 15 forms an elongate shell member 32 which at its front end has the nozzle orifice 8 and, at its rear end, abuts on the flange 19 of the spreader 14 with the contact face 39. The shell member 32 is provided on its rear end portion with a male thread 33 onto which is screwed the female thread of an end cap 34 which extends to a point behind the spreader 14 and, respectively, its end member 20 and forms the inlet opening 11. The end member 20 is formed with two oblique faces 35 which slant away from a center line and of which each leads to one of the channels 29 and, respectively, forms the end flare of the channel. The oblique faces 35 which slant away from the centerline divide the plastic flowing in through the inlet opening 11 and direct it into the channels 29 of constant cross-section. Adjoining the end cap 34, the shell member 32 is formed with a collar 36 for the jacket 16 which is supported on two flanges 37 at its front and rear ends. The jacket 16 has a clearance 38 from the shell 15 all round.

The nozzle cartridge according to FIGS. 4–7 adjoins a wall 101, which confines a mold cavity which is not shown in detail, and a machine part 102. At a distance from said machine part 102, there is a counter platen 103 as another machine part which is clamped relative to machine part 102 in a manner that is not shown, but which is known per se. Between the machine part 102 and, respectively, wall 101, and the counter platen 103, a nozzle cartridge 104 is interposed which, at its rear end is formed with a plane end face 105 and which bears on a plane area of the counter platen 103 without any interlocking. The nozzle cartridge 104 has at its rear end a single large inlet opening 111 which adjoins a hole 112 in the counter platen 103 to which is joined a feed pipe 113 of matching cross-sectional area for the plastic.

At its front end, the nozzle cartridge 104 forms an annular end face 106 which is at a right angle to the central axis and from which a circular spigot 107 projects steplike at the center in which the nozzle orifice 108 is located at the center. The spigot 107 is a very accurate sliding fit in a hole 109 of the wall 101 and the machine part 102 engages the nozzle cartridge 104 at its front end portion with a circular ledge 110. Apart from this, the nozzle cartridge 104 has no contact with machine parts. The machine parts in contact with the nozzle cartridge and other machine parts adjacent to the nozzle cartridge, but not shown in the drawing, generally are provided with means for cooling.

The nozzle cartridge 104 is provided with a spreader 14 which is a sliding fit in a shell 115 on which is placed a cylindrical jacket 116 which is not shown. Both the front end face and the spigot 107 as well as the rear end face 105 are formed by the shell 115. The spreader 114 is formed with a tip portion 117 which is conically tapered towards the front and whose tip is located in the nozzle orifice 108. Adjoining the tip portion 117 at the rear is an elongate spreader portion accommodating an elongate heating element 118.

At a point close to the end of the spreader 114, an entry fitting 123 projects radially from the spreader 114 to form a protection conduit. Entering through the entry fitting 123 are two power leads 124 for the heating element in the spreader and the sheath 125 of a temperature sensor 126 which leaves the entry fitting 123 inside the shell 115, but outside the spreader 114. The temperature sensor sheath 125 extends in contact with the spreader 114 and the shell 115 towards the front as far as the region of the tip portion 117 as close as possible to the tip of the latter. The temperature sensor sheath 125 is placed in a groove of the spreader, hugging the contour of the latter. Extending inside the sheath in a manner not shown in detail, but known per se, there are two insulated wires of different metals which are joined at their front end by a welding bead, i.e. a measuring junction 127, thus forming a thermocouple.

The shell 115 forms an essentially cylindrical cavity which conically tapers in the region of the tip portion 117 towards the nozzle orifice 108. From the tip portion 117 towards the rear, the spreader 114 contacts the shell 115 at two opposite sides along a circular arc-shaped interface 128, the circular arc on each side extending over more than 90 degrees. Between these circular arcs 128, the spreader is flattened behind the tip portion 117 on two opposite sides so that, between the spreader and the shell 115, there are two channels 129 which form a circular arc-shaped interface 130 with the shell, the circular arc on each side extending over less than 90 degrees. Each channel 129 extends from the tip portion 117 with a constant cross-section towards the rear.

The shell 115 forms an elongate shell member 132 which at its front end has the nozzle orifice 108. At its rear end, the elongate spreader changes into an entry fitting 123 having a longitudinal part 140 which radially projects in one direction, while in the opposite direction it continues into a lug 141. The entry fitting longitudinal part 140 and the lug 141 are each a close fit in a recess 142 at the end of the shell member 132 and project from it somewhat in the direction of the longitudinal centerline. The entry fitting longitudinal part 140 has a rectangular groove 143 in cross-section in which the power leads 124 and the sheath 125 are arranged in line side by side and are covered by a layer of insulating ceramic 144. The sheath 125 passes the heating element 118 and emerges at the side opposite the entry fitting 123 through a hole 145 in the lug 141 onto the surface of the shell member 132.

Covering the groove 143 and contacting the one entry fitting longitudinal part 140, there is another bar-shaped entry fitting longitudinal part 146 which continues on the side opposite the entry fitting 123 in a lug 147. The entry fitting longitudinal part 146 and the lug 147, are a slide fit in a recess 148 of an end cap 134 which is of annular shape and forms a section of the shell 115. Extending into this recess 148 are also those portions of the entry fitting longitudinal part 140 and of the lug 141 which project in the direction of the longitudinal centerline. A divider member 149 which is an integral part with the entry fitting longitudinal part 146 is arranged in the inlet opening 111 provided in the end cap 134, said divider member forming two oblique faces 135 of which each leads to one of the channels 129 or, in other words, forms the end flare of the channel. The oblique faces 135 slanting away from the centerline divide the plastic entering through the inlet opening 111 and feed the plastic into the channels 129 of constant cross-section.

The end cap 134 is secured by means of four screws 150 to the shell member 132. The end cap 134 and the shell member 132 sealingly contact each other with lapped end faces 151. The two entry fitting longitudinal parts 140 and 146 are compressed with lapped faces 152 providing the seal.

We claim:

1. In a hot-runner injection-molding machine including a nozzle cartridge installed between a wall delimiting a mold cavity and a counter platen, the nozzle cartridge having a shell and a spreader supported in the shell terminating in a pointed configuration at an outlet region of the nozzle cartridge, the improvement comprising:
   a spreader having front and rear ends;
   a shell extending over the spreader up to said rear end of the spreader and having front and rear end portions;
   a planar rear end face on said rear end portion of the shell for abutting engagement with a planar region on the counter platen;
   a forwardly projecting extension on said front end portion of the shell having a step shape with at least one cylindrical surface thereon engageable in an opening in the wall delimiting the mold cavity, said opening communicating with the mold cavity;
   a nozzle opening in said forwardly projecting extension;
   a pointed tip on said front end of the spreader disposed in said nozzle opening;
   an entry fitting at the rear of the spreader extending radially through the shell and having a passage therein;
   a heating means being provided in said spreader having power leads extending through said passage;
   a temperature sensor hole provided through the entry fitting; and
   a temperature sensor sheath containing a temperature sensor being provided extending between said spreader and said shell to the outlet region from the temperature sensor hole and said passage;
   the nozzle-cartridge being in contacting engagement with other parts of the machine only at said at least one cylindrical surface and said planar rear end face on said shell.

2. A machine as claimed in claim 1 and further comprising:
   an end cap on said rear end portion of the shell surrounding the rear end portion of the spreader; and
   screw means for removably connecting said end cap to said shell so that the spreader is removably retained in said shell by said end cap.

3. A machine as claimed in claim 1 and further comprising:
   an abutment surface on the rear end portion of said shell; and
   a radially extending flange on the rear end portion of the spreader engageable with said abutment surface for locating said spreader in said shell.

4. A machine as claimed in claim 1 wherein the nozzle cartridge has a central axis and further comprising:
   a channel adjacent said rear end portion of the shell and being open toward the rear in the direction of the central axis of the nozzle cartridge; and
   said entry fitting extending radially from and adjacent to said rear end of the spreader through said channel.

5. A machine as claimed in claim 1 wherein:
   said spreader has a tip portion at said front end thereof;
   said spreader is supported in contact with said shell from a position adjacent said tip portion to said rear end; and
   a plurality of fluid flow channels extend between and over the length of said spreader and said shell.

6. A machine as claimed in claim 2 and further comprising:
   lapped faces on said shell and said end cap in sealing engagement with each other;
   said entry fitting is provided between at least part of said end cap and at least part of said shell and having a radially extending portion outside of the shell, said fitting comprised of two parts having sealingly engaging lapped surfaces; and wherein
   said screw means comprises screw-threaded holes in said shell and screws extending through said end cap engaging in said screw-threaded holes, so that said end cap presses said lapped surfaces together when said screws are tightened.

7. A machine as claimed in claim 6 wherein:
   one of said parts of said entry fitting comprises a bar-shaped member engaging said end cap.

8. A machine as claimed in claim 7 wherein:
   the other part of said entry fitting comprises a bar-shaped member having a longitudinal groove therein, said one of said parts covering said groove thereby forming said passage;
   said temperature sensor hole is provided through said other part of said entry fitting; and
   insulating ceramic is provided in said groove at least in the area of said temperature sensor hole.

9. A machine as claimed in claim 6 wherein:
   said entry fitting has a rectangular cross-section; and
   rectangular cutouts corresponding to said entry fitting are provided in said end cap and shell for receiving said entry fitting in sealing engagement therewith.

10. A machine as claimed in claim 8 wherein:
    said longitudinal groove has a rectangular cross-section; and
    said power leads and temperature sensor sheath extend substantially radially with respect to the central axis of the nozzle cartridge.

11. A machine as claimed in claim 8 wherein:
    said temperature sensor sheath hole is disposed adjacent the side of the spreader opposite to said radially extending portion of said entry fitting outside the shell; and
    said temperature sensor sheath has a bend therein in said groove adjacent said hole.

12. A machine as claimed in claim 7 and further comprising:

a spreader portion projecting from said one of said entry fitting parts upstream of fluid flow; and oblique faces on said spreader portion facing upstream for dividing the fluid flow entering the nozzle cartridge through said end cap.

13. A machine as claimed in claim 11 and further comprising:

a spreader portion projecting from said one of said entry fitting parts upstream of fluid flow; and oblique faces on said spreader portion facing upstream for dividing the fluid flow entering the nozzle cartridge through said end cap.

14. A machine as claimed in claim 5 and further comprising:

lapped faces on said shell and said end cap in sealing engagement with each other;

said entry fitting is provided between at least part of said end cap and at least part of said shell and having a radially extending portion outside of the shell, said fitting comprised of two parts having sealingly engaging lapped surfaces; and wherein said screw means comprises screw-threaded holes in said shell and screws extending through said end cap engaging in said screw-threaded holes, so that said end cap presses said lapped surfaces together when said screws are tightened.

15. A machine as claimed in claim 14 wherein:

one of said parts of said entry fitting comprises a bar-shaped member engaging said end cap.

16. A machine as claimed in claim 15 wherein:

the other part of said entry fitting comprises a bar-shaped member having a longitudinal groove therein, said one of said parts covering said groove thereby forming said passage;

said temperature sensor hole is provided through said other part of said entry fitting; and insulating ceramic is provided in said groove at least in the area of said temperature sensor hole.

17. A machine as claimed in claim 16 wherein:

said temperature sensor sheath hole is disposed adjacent the side of the spreader opposite to said radially extending portion of said entry fitting outside the shell; and said temperature sensor sheath has a bend therein in said groove adjacent said hole.

18. A machine as claimed in claim 17 and further comprising:

a spreader portion projecting from said one of said entry fitting parts upstream of fluid flow; and oblique faces on said spreader portion facing upstream for dividing the fluid flow entering the nozzle cartridge through said end cap.

* * * * *